United States Patent [19]

Hehl

[11] 4,315,728

[45] Feb. 16, 1982

[54] ADJUSTABLE SLIDE SHOE FOR DIE CARRIER PLATE OF INJECTION MOLDING MACHINE

[76] Inventor: Karl Hehl, Arthur-Hehl-Strasse 32, 7298 Lossburg 1, Fed. Rep. of Germany

[21] Appl. No.: 201,344

[22] Filed: Oct. 27, 1980

[30] Foreign Application Priority Data

Oct. 25, 1979 [DE] Fed. Rep. of Germany ....... 2943118
Feb. 20, 1980 [DE] Fed. Rep. of Germany ....... 3006230
Aug. 5, 1980 [DE] Fed. Rep. of Germany ....... 3029597

[51] Int. Cl.³ .............................................. B29F 1/00
[52] U.S. Cl. .................................... 425/589; 425/450.1
[58] Field of Search ................... 425/107, 450.1, 451.2, 425/556, 542, 589, 595

[56] References Cited

U.S. PATENT DOCUMENTS

| | | | |
|---|---|---|---|
| 3,669,599 | 6/1972 | Snider et al. | 425/595 |
| 3,674,400 | 7/1972 | Sauerbruch et al. | 425/556 X |
| 3,712,779 | 1/1973 | Luginbuhl | 425/589 |
| 3,841,823 | 10/1974 | Hehl | 425/107 X |
| 3,976,416 | 8/1976 | Hehl | 425/451.2 X |
| 4,094,621 | 6/1978 | Hehl | 425/450.1 X |
| 4,105,390 | 8/1978 | Hehl | 425/450.1 |
| 4,222,730 | 9/1980 | Hehl | 425/450.1 |
| 4,269,259 | 5/1981 | Ueno et al. | 425/450.1 X |

Primary Examiner—J. Howard Flint, Jr.
Attorney, Agent, or Firm—Joseph A. Geiger

[57] ABSTRACT

An adjustable weight-supporting guidance arrangement for the movable die carrier member of an injection molding machine, consisting of two laterally spaced guide rails on the machine base with horizontal and vertical guide tracks engaged by matching guide faces of two slide shoes which are adjustably clamped to inclined strut extensions on the bottom corners of the movable die carrier member. The positions of the slide shoes are determined by means of threaded adjustment members, in response to readings obtained by means of a concentricity gauge.

12 Claims, 5 Drawing Figures

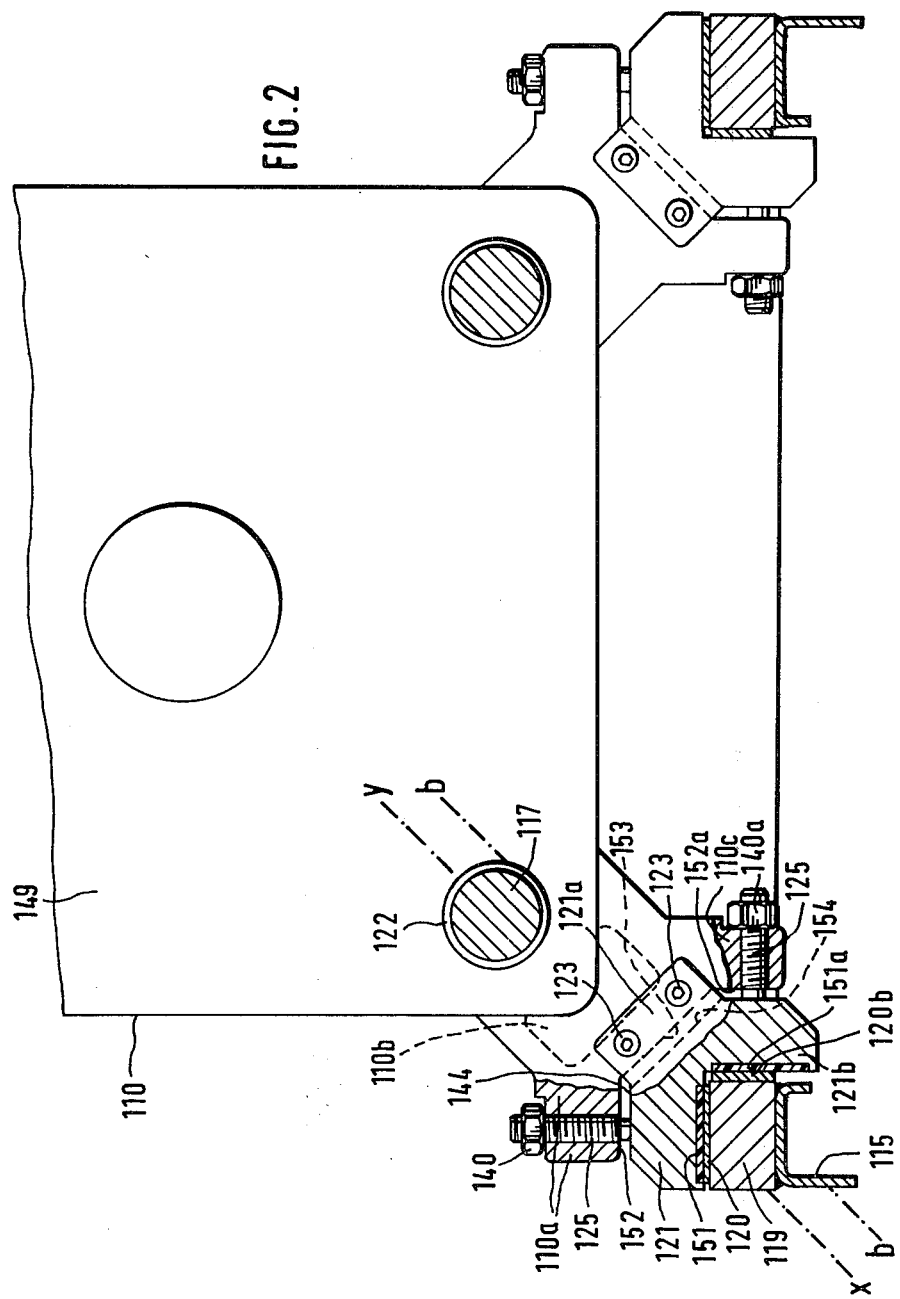

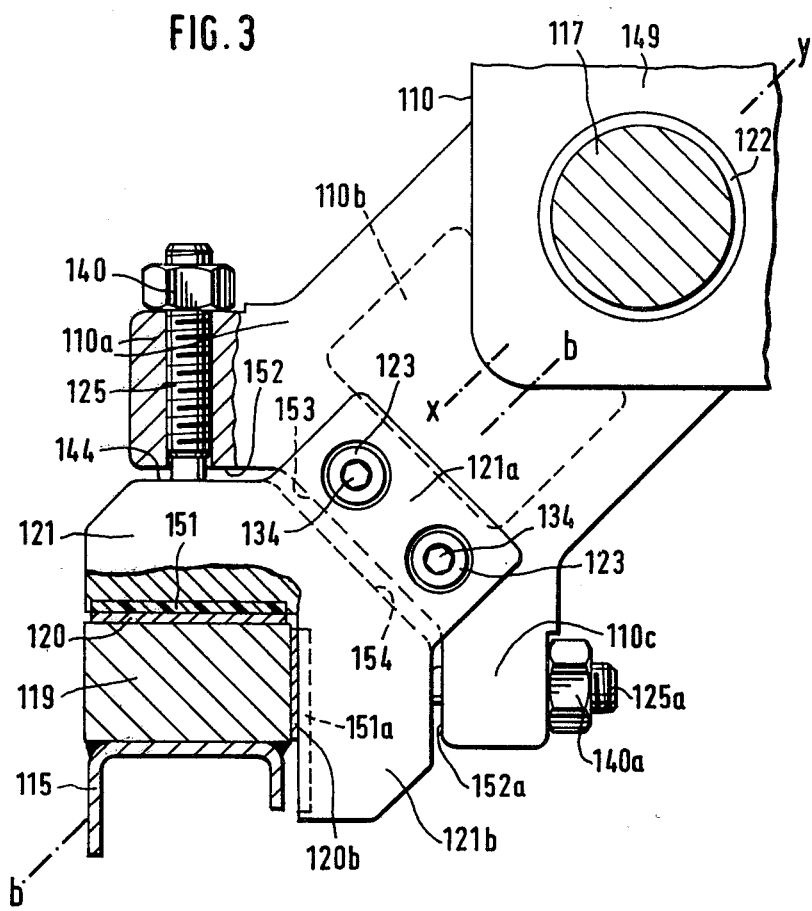

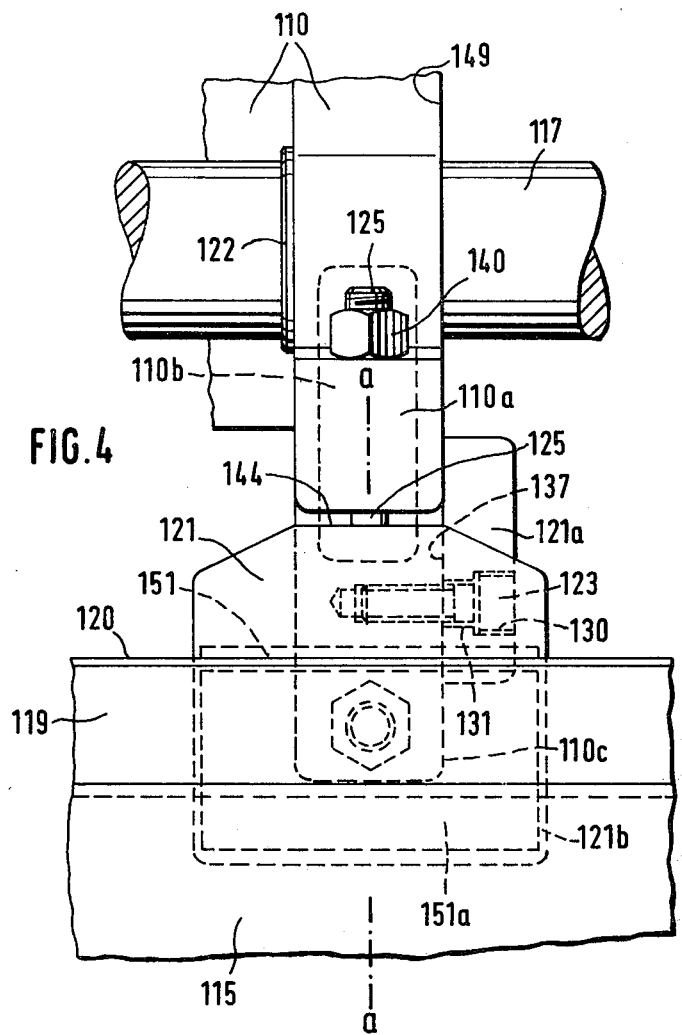

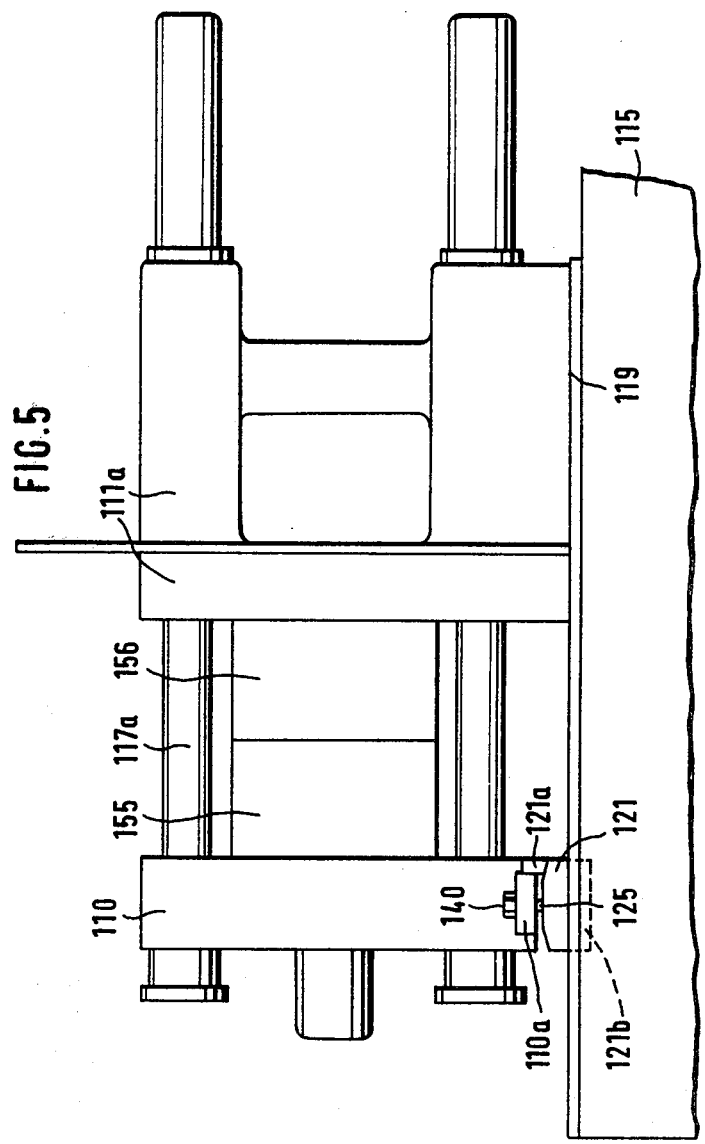

4,315,728

ADJUSTABLE SLIDE SHOE FOR DIE CARRIER PLATE OF INJECTION MOLDING MACHINE

BACKGROUND OF THE INVENTION

1. Field of the Invention

The present invention relates to injection molding machines, and, more particularly, to the die closing unit of an injection molding machine and to a slide support and adjustable guide shoes for the movable die carrier plate of such a die closing unit.

2. Description of the Prior Art

The prior art in the field of injection molding machines encompasses at least three basic machine types which differ in the arrangement of their die closing units, and particularly with respect to the arrangement of the hydraulic drive for the movable die carrier member. The so-called pull-type die closing unit normally features two or four drive cylinders in a parallel arrangement, with piston rods which reach past or through the injection molding die, having their distal extremities attached to the movable die carrier plate. The weight of the latter may be carried by the piston rods alone, but, preferably, it is supported on a cantilever-type guide frame by means of rollers or sliding guide shoes. Such a die closing unit is disclosed, for example, in U.S. Pat. No. 3,674,400 and in U.S. Pat. No. 3,841,823.

In a push-type die closing unit, a movable die carrier plate, or a die carrier frame, is longitudinally guided on two or four stationary tie rods which extend between two stationary plates on the machine base, thus forming a rigid guide frame with the latter. The movable die carrier member is pushed into its closed position, either by means of a transversely oriented hydraulic actuator which drives a knee linkage, or by means of an axially aligned hydraulic actuator whose piston rod extends parallel to the tie rods in the center axis of the die closing unit. This third type of die closing unit is much more compact than the knee-linkage-type die closing unit, and it is therefore frequently preferred over the latter, especially in the case of heavy-duty injection molding machines. Such a die closing unit is shown, for example, in U.S. Pat. No. 4,094,621.

Most in-line push-type die closing units for heavy-duty applications utilize four tie rods which are arranged at the four corners of a square, with their extremities rigidly clamped to the stationary die carrier plate and to the head plate of the power cylinder, respectively. While such an arrangement ordinarily offers excellent guide conditions and alignment accuracy for the movable die carrier frame riding on the four tie rods, it has been found that, over extended periods of service, the guide bushings of the die carrier frame suffer wear to the extent that the alignment accuracy of the injection molding die halves deteriorate, and, consequently, the dimensional consistency of the injection-molded parts decreases. The replacement and fitting of new guide bushings in the die carrier frame is time consuming and, costly, because, in most cases, it must be done by the manufacturer.

It has therefore already been suggested to use exterior guide elements to support the movable die carrier member, in an attempt to at least partially relieve the tie rods, or the piston rods, respectively, of their load-carrying function. Frequently, however, such an auxiliary load-carrying guide brings with it operational problems resulting from misalignment and/or the impossibility of precisely measuring and adjusting its load-carrying action.

An adjustable die carrier guide arrangement is disclosed in the above-mentioned U.S. Pat. No. 3,674,400. There, it is suggested that the guide members for a pull-type die closing unit be in the form of sliding guide shoes or guide rollers, with vertical adjustability provided in the form of a threaded spindle, or an inclined plane in conjunction with a spindle, or an eccentric adjustment for guide rollers, or, lastly, a vertically guided spring-loaded slide shoe. To the extent that adjustability is taught in the disclosure of this patent, such adjustability is controllable only with difficulty, if at all, so that the earlier-mentioned wear conditions on the guide bushings will to a large extent, still be present.

SUMMARY OF THE INVENTION

It is the primary objective of the present invention to provide an improved arrangement of adjustable load-carrying slide shoes on a movable die carrier member which makes it possible to adjust the slide shoes in such a way that the tie rods are substantially relieved of their load-carrying function and, under certain circumstances, even of their lateral guide function, for the purpose of reducing bushing wear and correspondingly increasing the operational longevity of the die closing unit without a reduction in its accuracy. A further objective of the present invention aims at a standardization of the suggested slide shoes for use in connection with different sizes of injection units.

The present invention proposes to attain these objectives by suggesting an adjustable supporting arrangement for the movable die carrier member of a die closing unit which comprises two fixed guide rails on the machine base near the bottom corners of the movable die carrier frame, or plate, with flat horizontal and vertical guide tracks in exact parallel alignment with the tie rods, so that a pair of slide shoes which are adjustably clamped to the movable die carrier frame cooperate with the guide tracks on the two guide rails, and, if adjusted appropriately, relieve the tie rods of a major portion of their weight-carrying function.

In a preferred embodiment of the invention, the slide shoes are symmetrical with respect to a diagonally inclined longitudinal plane, having identical horizontal and vertical leg portions with shallow rectangular recesses in their guide faces holding plastic anti-friction plates. These anti-friction plates ride on smooth horizontal and vertical track strips of hardened steel on the upper and inner sides of the two guide rails. The adjustability of the slide shoes is provided by means of threaded pressure elements which, when rotated, advance the horizontal legs of the guide shoes downwardly and the vertical legs outwardly, against the respective guide tracks of the rails. Each guide shoe is clamped against a short strut which extends diagonally from a lower corner of the carrier frame. The clamping fasteners reach through enlarged bores of the slide shoes, so that adequate play is available for the adjustment displacements of the slide shoe in relation to the movable die carrier frame.

The precise adjustment of the slide shoes in relation to the movable die carrier frame is preferably performed with the aid of a special indicator assembly which, when mounted in the center axis of the die closing unit, as defined by the stationary die carrier plate, will give a precise alignment reading for the movable die carrier frame, both for its concentricity and its trueness of perpendicularity. By thusly adjusting the slide shoes on the two guide rails, it is possible to accurately position the movable die carrier frame in such a way that the tie rods are subjected to a minimum of transverse frictional loads, with the result that the operational wear on the tie rod bushings is kept to a minimum, and, consequently, the alignment precision for a high dimensional consistency of the injection-molded parts is maintained over a much longer period of time. The invention has the additional advantage of facilitating the performance of periodic verifications of the die carrier alignment, coupled with a readjusting of the slide shoes, if necessary, and/or a simple replacing of the anti-friction plates of the slide shoes, if the latter show a predetermined amount of wear.

BRIEF DESCRIPTION OF THE DRAWINGS

Further special features and advantages of the invention will become apparent from the description following below, when taken together with the accompanying drawings which illustrate, by way of example, a preferred embodiment of the invention which is represented in the various figures as follows:

FIG. 2 is an enlarged transverse cross section through the die closing unit of FIG. 1, showing the supporting arrangement for the movable die carrier frame;

FIG. 3 is a further enlarged portion of the cross section of FIG. 2, showing details of the adjustable supporting arrangement of the invention;

FIG. 4 is a likewise enlarged portion of the elevational view of FIG. 1, corresponding in scale to FIG. 3; and FIG. 5 shows, in an elevational view, a pull-type die closing unit which shows a different application of the adjustable supporting arrangement of the present invention.

DESCRIPTION OF THE PREFERRED EMBODIMENT

Figure 1:
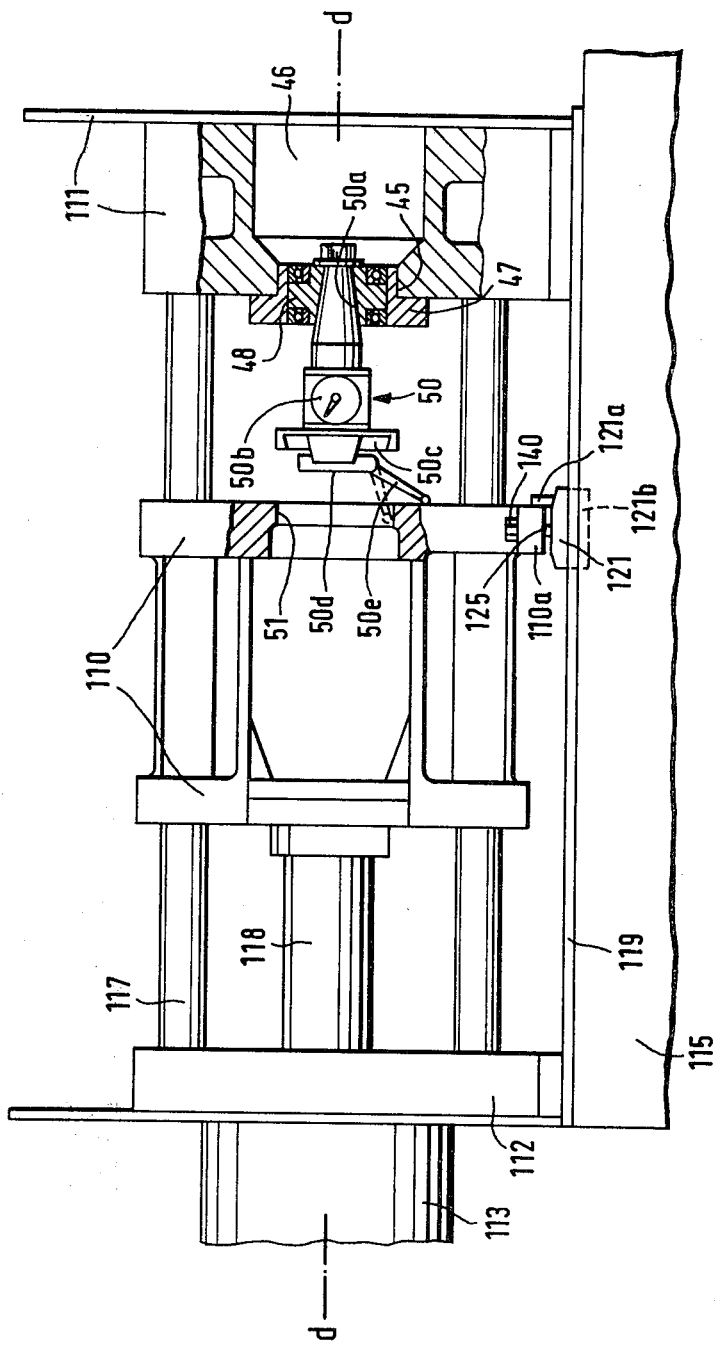
FIG. 1 shows, in an elevational view, partially cross-sectioned, a push-type die closing unit of an injection molding machine with a supporting arrangement embodying the present invention.

In FIG. 1 of the drawing is shown a push-type die closing unit which is mounted in a normal, horizontal arrangement on top of a machine base 115. This die closing unit has a stationary die carrier plate 111 and a stationary cylinder head plate 112 which are bolted to the machine base 115, at a longitudinal distance from each other. Between the two plates extend four heavy tie rods 117 which reach through fitted bores of the two plates and are attached to them by means of axial clamping connections (not shown). The axes of the four tie rods 117 are parallel to one another and located at the four corners of a right square prism, thereby defining a horizontal movement axis or injection unit center axis d—d in the center of the prism.

Aligned with the movement axis of the die closing unit, and arranged behind its head plate 112, is a heavy hydraulic actuator or main cylinder 113 whose piston rod 118 produces the die opening and closing movements. For this purpose, the piston rod 118 is attached to a movable die carrier frame 110 which is supported and guided on the four tie rods 117. The movable die carrier frame 110 carries on its forwardly oriented transverse face 149 (FIG. 4) the movable half of an injection molding die, the stationary die half being attached to the rearwardly oriented mounting face of the stationary die carrier plate 111. Because the mounting of the die halves on the respective carrier plates is well known, the die has been omitted in FIG. 1 for reasons of clarity (compare FIG. 5).

The movable die carrier frame 110, sliding back and forth on the four tie rods 117, engages the latter with precisely fitted guide bushings 122 (see FIG. 3). The precision with which the frame 110 is guided on the tie rods 117 determines the precision with which the two die halves are aligned with each other during the injection molding operation. Consequently, the dimensional consistency of the injection-molded parts is a function of this precision of guidance. In increasing numbers of cases, injection-molded parts require a very high degree of dimensional consistency, since more and more precision-machined or precision-stamped metal parts are being replaced with injection-molded parts, due to the availability of better and more highly specialized plastic materials. Applications in which the use of high-precision injection-molded parts has been very successful are measuring instruments and time pieces, for example, as well as other areas where precision drives and mechanisms are employed.

An important consideration with respect to the precision of guidance of the movable die carrier frame 110 is therefore the longevity of this guidance arrangement, i.e. the degree of wear which occurs in the friction parts, especially in the guide bushings 122 which are seated in the front and rear flanges of the die carrier frame 110. The present invention, in order to minimize this wear, therefore provides for the movable die carrier frame 110 to be equipped with two slide shoes 121 on the bottom corners of its die mounting flange, for supportive engagement with two parallel guide rails 119 which are arranged on top of the machine base 115, laterally outside of the movable die carrier frame 110.

The configuration of the slide shoes 121 and of their supporting guide rails 119 is shown in FIGS. 2–4. There, it can be seen that each slide shoe 121 has a transversely oriented vertical clamping flange 121a with which it is clamped against an axially forwardly facing clamping face 137 of the movable die carrier frame 110. The clamping face 137 is preferably aligned with, or a continuation of, the die mounting face 149 of the frame 110. Two threaded fasteners 123, in the form of countersunk socket head cap screws, clamp the slide shoe 121 against a short inclined strut 110b which extends diagonally from the bottom corner of the movable die carrier frame 110.

The clamping attachment between the slide shoe 121 and the inclined strut 110b, when released, gives the slide shoe 121 a limited adjustability within the radial clearances 130 and 131 between the head and shaft of the clamping screws 123 and the associated bores and counterbores in the clamping flange 121a (FIG. 4). By making the clearances 130 and 131 larger than would be required normally, it is possible to provide sufficient adjustment freedom for the slide shoes 121 to accomplish the desired purpose. Precise adjustment settings are obtainable by means of a set of vertical and horizontal adjusting members 125 and 125a, respectively, which, when threaded against the slide shoe 121, shift the latter in the direction of the guide rail 119. Accordingly, when the vertical adjusting member 125 is screwed downwardly, it displaces the slide shoe 121 downwardly, away from the horizontal heel portion 110a of the inclined strut 110b, thereby pressing the horizontal leg portion of the slide shoe 21 against the guide rail 119 and, at a given setting, supporting the weight of the die carrier frame 110 against the guide rail 119 by raising the frame 110 just enough to prevent upward pressure against the tie rods 117.

Similarly, a horizontal adjustment of the slide shoe 121 towards the guide rail 119 is obtainable by means of a horizontal adjusting member 125a which is arranged in a vertical heel portion 110c of the inclined strut 110b. This adjustment, performed simultaneously on both slide shoes, is capable of producing a clearance-free lateral guidance of the movable die carrier frame 110 on the two guide rails 119. The final adjustment settings of the two adjusting members 125 and 125a are secured by means of counter-nuts 140 and 140a, respectively. Finally, the slide shoes 121 are firmly clamped against the struts 110b of the frame 110 by tightening the clamping screws 123. The adjusting members 125 and 125a are hexagon socket set screws, preferably of the fine-thread type.

By arranging the two guide rails 119 outside of and below the lower tie rods 117, it is possible to attach the guide rails directly to the top surface of the machine base 115, while mounting the slide shoes 121 on two diagonally inclined rigid struts 110b which are integral extensions of the movable die carrier frame 110. The clamping faces 137 for the clamping flanges 121a of the slide shoes can thus be machined together with the die mounting face 149 on the die mounting flange of frame 110. A diagonally inclined transition web 153 links the lower side 152 of the horizontal heel portion 110a with the outer side 152a of the vertical heel portion 110c. This transition web 153 leaves an appropriate clearance to a similarly inclined transition surface 154 on the back of the slide shoe 121. The web 153 and the surface 154 are preferably inclined at 45°, i.e. perpendicularly to the diagonal axis x-y of the frame 110.

By making the slide shoe 121 symmetrical with respect to a diagonally inclined plane b—b, it is possible to use identical slide shoes on both guide rails 119. Accordingly, a guide face which serves as a horizontal guide face for one slide shoe will serve as a vertical guide face for the other slide shoe, and vice versa. The two guide faces of each slide shoe 121 are preferably constituted by special anti-friction plates 151 and 151a of high-polymer material. The two plates are held in place by being inserted into matching shallow recesses of the horizontal and vertical leg portions of the slide shoe 121. This makes it possible to conveniently replace worn anti-friction plates with new ones by merely removing the slide shoe 121 from its clamping attachment and by either replacing the entire shoe with a new one, or replacing only the anti-friction plates 151 and/or 151a in the slide shoe 121. The anti-friction plates 151 and 151a may be cut from a continuous strip of material. The high-polymer plastic material which is used for this purpose has a special formulation for the lowest-possible coefficient of friction, combined with a high dimensional stability under compression stress.

The two guide rails 119 on the machine base 115 are equipped with special track strips 120 and 120b of smooth, hardened steel. These track strips thus form optimal friction pairs with the anti-friction plates 151 and 151a of the slide shoes.

The slide shoe 121 is also symmetrical with respect to its longitudinal extent, its transverse plane of symmetry a—a (FIG. 4) being aligned with the center of the inclined strut 110b of frame 110 and with its adjusting member 125 and being parallel to the die mounting face 149 of the die carrier frame 110. In the longitudinal sense, the slide shoe 121 is preferably more than twice as long as the longitudinal dimension of the strut 110b. The latter has a generally rectangular cross section, the horizontal heel portion 110a being somewhat heavier than the vertical heel portion 110c. As a result, the slide shoe 121 and its longitudinal symmetry plane b—b are offset downwardly from the diagonal plane x-y of the die carrier frame 110. The clamping face 137 and the transition surface 154 of the slide shoe, by being at right angles to each other, serve as convenient reference faces for the machining of the recesses of the anti-friction plates 151 and 151a.

An optimal adjustment of the slide shoe 121 in relation to the movable die carrier frame 110 is then present, when the contract pressures between the anti-friction plates 151 and 151a of the slide shoe 121 and the track strips 120 and 120b of the rail 119 are such that the tie rods 117 are essentially relieved of their weight-carrying function in the vertical sense and also at least partially relieved of their guide function in the lateral sense. This setting reduces the function of the tie rods 117 almost entirely to that of axial stress members, subjected to the tension which is created by the die-closing action of the die closing unit, especially when the main cylinder is clamping the movable die carrier frame 110 and its movable die half to the stationary die carrier plate and its die half. Obviously, the removal of the weight-carrying function from the tie rods 117 will greatly reduce, if not eliminate, the wear on the guide bushings 122 of the die carrier frame 110, thereby correspondingly increasing the longevity of the die closing unit. The continuous adjustability of the position of the slide shoes 121, furthermore, makes it possible to adjust more precise guidance conditions on the guide rails 119 than would be otherwise possible with the tie rods 117 alone.

In order to obtain the optimal position adjustment for the two slide shoes 121, the invention further proposes the use of a special position measuring instrument or concentricity gauge 50 which gives a precise reading of the alignment trueness between the guided movable die carrier frame 110 and the stationary die carrier plate 111, as well as a reading of the alignment of the transverse plane of the die mounting face 149 of frame 110. The readout dial of the concentricity gauge 50 shows in magnification the effects of any adjustment rotations on the two adjusting members 125 and 125a against the slide shoe 121. Appropriate trial-and-error adjustment maneuvers on the adjusting members 125 and 125a will result in a guidance setting of the movable die carrier frame 110 in which its axial concentricity alignment and its transverse planar alignments are true, an indication that the tie rods 117 are substantially free of transverse frictional loads.

The concentricity gauge 50 is mounted in a centering bore 45 of the stationary die carrier plate 111 which leads outwardly into a larger central opening 46 for the plastification cylinder (not shown) of the injection molding machine. The gauge 50 is precisely centered by means of a special adaptor base 47 which is received in the centering bore 45 and which, in turn, serves as a precision journal base for the rotatable holder 48 of the concentricity gauge 50. A shaft with a tapered shank 50a is engaged in a corresponding tapered seat of the holder 48, carrying on its other end a dial gauge 50b. On the axial side of the housing of the dial gauge 50b is further arranged an indicator slide 50c which carries a transversely displaceable indicator head 50d with a pivotable indicator finger 50e.

The indicator finger 50e will sense either the flat surface of the die mounting face 149 or the cylindrical surface of a centering bore 51 in the movable die carrier frame 110. Readings taken from the die mounting face 149 will indicate the planar alignment of the frame 110, while readings taken from its centering bore 51 will indicate its concentricity alignment with the stationary die carrier plate 111. For an optimal adjustment of the slide shoe positions, it is further advisable to weigh down the movable die carrier frame 110 with a weight which corresponds approximately to the weight of an average movable half of an injection molding die.

In FIG. 5 of the drawing, it can be seen that the above-described supporting arrangement for a movable die carrier frame of a push-type die closing unit can also be used advantageously for the movable die carrier plate 110 of a pull-type die closing unit. As in the case of the push-type die closing unit, the pull-type die closing unit is mounted on the top surface of a machine base 115, but, unlike in the former case, the only rigid attachment between the die closing unit and the machine base is at the side of the cylinder mount 111a. The latter has incorporated in it four parallel die closing cylinders whose piston rods 117a take the place of the previous tie rods 117, having their distal extremities clamped to the movable die carrier plate 110. The two die halves 155 and 156 are attached to the parallel transverse die mounting faces on the movable die carrier plate 110 and on the stationary cylinder mounts 111a, respectively.

While it is well known to relieve the piston rods 117a of any weight-carrying function with respect to the movable die carrier plate 110, especially in the case of heavy pull-type die closing unit, the use of the adjustable slide shoes 121a of the present invention makes it possible to achieve a precise guidance alignment for an optimal closing accuracy of the die halves 155 and 156. The absence of such an adjustability of the die carrier guides will mean corresponding wear on the guide bushings which guide the piston rods 117a in the die mount 111a.

It should be understood, of course, that the foregoing disclosure describes only a preferred embodiment of the invention and that it is intended to cover all changes and modifications of this example of the invention which fall within the scope of the appended claims.

I claim the following:

1. In an injection molding machine in which a machine base has mounted on it a die closing unit with a substantially horizontally oriented movement axis and, as part thereof, carries a stationary die carrier member to which is attached a stationary portion of an injection molding die, a movable die carrier member carrying a movable portion of said die, and a set of spaced tie rods which extend parallel to said movement axis, reaching axially through the movable die carrier member so as to position and guide the latter, the combination therewith of an adjustable supporting arrangement for the movable die carrier member comprising in combination:

two fixed guide rails which are arranged on the machine base in parallel alignment with the tie rods of the die closing unit, below and on opposite sides of the movement axis of the latter, the guide rails having substantially horizontal guide tracks on their upper sides and substantially vertical guide tracks on their inner sides;

two slide shoes which are attached to the movable die carrier member in such a way that they engage the guide rails, each slide shoe having vertical and horizontal guide faces in contact with the corresponding guide tracks of the rails;

means for adjustably clamping the slide shoes to the movable die carrier member; and means for threadingly lowering each slide shoe in relation to the movable die carrier member, so as to make it possible to transfer from the tie rods to the horizontal guide tracks of the guide rails at least a substantial portion of the weight of the movable die carrier member and attached die portion.

2. An adjustable supporting arrangement as defined in claim 1, further comprising means for threadingly displacing each slide shoe laterally outwardly in relation to the movable die carrier member, so as to make it possible to accurately position and guide said member in the lateral sense on the vertical guide tracks of the guide rails.

3. An adjustable supporting arrangement as defined in claim 2, wherein the slide shoe has an angular cross-sectional outline defined by a horizontal leg portion arranged above the guide track and a depending vertical leg portion arranged laterally inside the guide track;

the movable die carrier member has arranged on each lateral side a horizontal heel portion which is arranged above the horizontal leg portion of the slide shoe and a vertical heel portion which is arranged laterally inside the vertical leg portion of the slide shoe;

the slide shoe lowering means is defined by a substantially vertically oriented threaded adjustment member in the horizontal heel portion of the movable die carrier member which is threadable downwardly into adjustment contact with the horizontal leg portion of the slide shoe; and the slide shoe displacing means is defined by a substantially horizontally oriented threaded adjustment member in the vertical heel portion of the movable die carrier member which is threadable laterally outwardly into adjustment contact with the vertical leg portion of the slide shoe.

4. An adjustable supporting arrangement as defined in any one of claims 1, 2, or 3, wherein the slide shoe clamping means includes an upstanding clamping flange on the slide shoe with a clamping face in alignment with a transverse plane that is perpendicular to the movement axis, a matching clamping face on the movable die carrier member, and at least one threaded clamping fastener capable of clamping the slide shoe clamping flange against the clamping face of the movable die carrier member, the clamping fastener reaching through the clamping flange with radial clearance which allows limited adjustment displacements of the slide shoe relative to the movable die carrier member.

5. An adjustable supporting arrangement as defined in claim 4, wherein the outer sides of the two leg portions of the slide shoe are linked by an inclined transition surface;

the opposing inner sides of the two heel portions of the movable die carrier member are similarly linked by an inclined transition web; and the leg portions with their transition surface and the heel portions with their transition web form a continuous gap between the slide shoe and the movable die carrier member.

6. An adjustable supporting arrangement as defined in any one of the claims 1, 2, or 3, wherein
the lateral spacing of the guide rails is greater than the width of the movable die carrier member; and
the horizontal and vertical heel portions of the movable die carrier member are protrusions on two inclined struts which extend downwardly and laterally outwardly from said member.

7. An adjustable supporting arrangement as defined in claim 6, wherein
the die closing unit has four tie rods whose axes are located at the edges of a right square prism;
the movable die carrier member has a die mounting flange of substantially square outline with bores for the tie rods near its four corners; and
the inclined struts are integral portions of the die mounting flange, extending from its two bottom corners in alignment with a diagonal axis of the die mounting flange.

8. An adjustable supporting arrangement as defined in any one of claims 1, 2, or 3, wherein
at least the horizontal guide tracks of the two guide rails are constituted by the surfaces of thin strips of heat treated steel which are attached to the upper surface of the guide rails.

9. An adjustable supporting arrangement as defined in any one of claims 1, 2, or 3, wherein
at least the horizontal guide faces of the two slide shoes are constituted by the surfaces of thin anti-friction plates of high-polymer plastic material; and
the anti-friction plates are of rectangular outline and are received inside matching shallow recesses in the leg portions of the slide shoes.

10. An adjustable supporting arrengement as defined in claim 9, wherein
the anti-friction plates are interchangeably retained in their recesses in the leg portions of the slide shoes.

11. An adjustable supporting arrangement as defined in any one of claims 1, 2, or 3, further comprising
indicator means for visually displaying the degree of trueness of the axial alignment between the stationary die carrier member and the movable die carrier member of the die closing unit.

12. An adjustable supporting arrangement as defined in claim 11, wherein
the indicator means is a concentricity gauge which is adapted for mounting on the stationary die carrier member, positioned by a centering bore of the latter; and
the concentricity gauge includes a rotatable shaft with a transverse slide which carries an indicator head and a pivotable indicator finger, the latter being adapted for selective sensing engagement with the cylindrical surface of a centering bore in the movable die carrier member and with a planar die mounting face on said member, thereby also serving to visuallydisplay the trueness of perpendicularity between said face and the movement axis of the die closing unit, as defined by the centering bore of the stationary die carrier member.

* * * * *